United States Patent
Krivitzky et al.

(10) Patent No.: US 9,567,942 B1
(45) Date of Patent: Feb. 14, 2017

(54) CENTRIFUGAL TURBOMACHINES HAVING EXTENDED PERFORMANCE RANGES

(75) Inventors: Eric M. Krivitzky, Brownsville, VT (US); Louis M. Larosiliere, Quechee, VT (US)

(73) Assignee: Concepts NREC, LLC, White River Junction, VT (US)

(*) Notice: Subject to any disclaimer, the term of this patent is extended or adjusted under 35 U.S.C. 154(b) by 871 days.

(21) Appl. No.: 13/310,325

(22) Filed: Dec. 2, 2011

Related U.S. Application Data

(60) Provisional application No. 61/419,021, filed on Dec. 2, 2010, provisional application No. 61/419,019, filed on Dec. 2, 2010.

(51) Int. Cl.
*F02B 33/44* (2006.01)
*F02K 1/36* (2006.01)
*B01D 46/00* (2006.01)

(52) U.S. Cl.
CPC ............. *F02K 1/36* (2013.01); *B01D 46/0069* (2013.01)

(58) Field of Classification Search
CPC ............ Y10S 239/07; F02K 1/28; F02K 1/30; F02K 1/32; F02K 1/34; F02K 1/36; B01D 46/0068; B01D 46/0069
USPC ............................ 60/611, 605.2; 239/DIG. 7
See application file for complete search history.

(56) References Cited

U.S. PATENT DOCUMENTS

| | | | | |
|---|---|---|---|---|
| 2,052,869 A | * | 9/1936 | Coanda | D02G 1/161 131/211 |
| 2,656,096 A | * | 10/1953 | Schwarz | F04D 29/441 415/115 |
| 2,832,292 A | * | 4/1958 | Edwards | 417/360 |
| 2,838,227 A | * | 6/1958 | Thomas et al. | 415/43 |
| 3,462,071 A | * | 8/1969 | Garve | 415/116 |
| 3,684,396 A | * | 8/1972 | Ball | F04D 29/422 415/144 |
| 3,730,639 A | * | 5/1973 | Moore et al. | 415/119 |
| 3,887,295 A | * | 6/1975 | Yu | 415/116 |

(Continued)

OTHER PUBLICATIONS

Hathaway et al., NASA/TM-2002-211569 Self-Recirculating Casing Treatment Concept for Enhanced Compressor Performance, Jul. 2002, entire document.*

*Primary Examiner* — Nicholas J Weiss
*Assistant Examiner* — Jason T Newton
(74) *Attorney, Agent, or Firm* — Downs Rachlin Martin PLLC

(57) ABSTRACT

Centrifugal turbomachines, such a centrifugal compressors, centrifugal blower, and centrifugal pumps, having unique treatments that enhance their performance ranges. In one arrangement, the treatment involves injecting a relatively high-momentum flow proximate to the blade-tip clearance gap at the inlet to the impeller of the turbomachine in a manner that reenergizes flow at the gap. The injected high-momentum flow can be taken from a location downstream of the outlet of the impeller and/or from a flow external to the turbomachine. In another arrangement, the non-self-bleed-type treatment involves providing the centrifugal turbomachine with a secondary flow path upstream of the inlet to the impeller. In one example, the flow of working fluid to the secondary flow path is modulated according to the mass flow of the working fluid. During times of higher flow, the secondary flow path is opened, and at times of lower flow, the secondary flow path is closed.

56 Claims, 7 Drawing Sheets

(56) References Cited

U.S. PATENT DOCUMENTS

| | | | | |
|---|---|---|---|---|
| 3,901,620 A * | 8/1975 | Boyce | | 415/1 |
| 4,642,023 A * | 2/1987 | Dunn | | 415/58.5 |
| 4,689,960 A * | 9/1987 | Schroder et al. | | 60/607 |
| 4,696,165 A * | 9/1987 | Bucher | | 60/609 |
| 4,743,161 A * | 5/1988 | Fisher et al. | | 415/58.4 |
| 4,990,053 A * | 2/1991 | Rohne | | 415/58.4 |
| 5,218,822 A * | 6/1993 | Legg | | 60/611 |
| 5,246,335 A * | 9/1993 | Mitsubori et al. | | 415/58.3 |
| 5,304,033 A * | 4/1994 | Tang | | 415/206 |
| 5,458,457 A * | 10/1995 | Goto et al. | | 415/115 |
| 5,707,206 A * | 1/1998 | Goto et al. | | 415/173.1 |
| 5,762,034 A * | 6/1998 | Foss | | F01P 5/06 123/41.49 |
| 5,806,303 A | 9/1998 | Johnson | | 60/262 |
| 6,379,110 B1 * | 4/2002 | McCormick et al. | | 415/119 |
| 6,582,188 B2 * | 6/2003 | Rippl | | 415/116 |
| 6,623,239 B2 * | 9/2003 | Sahay et al. | | 415/119 |
| 7,021,058 B2 * | 4/2006 | Scheinert | | F02B 29/0412 415/206 |
| 7,025,557 B2 * | 4/2006 | Japikse et al. | | 415/1 |
| 7,074,006 B1 * | 7/2006 | Hathaway et al. | | 415/1 |
| 7,097,414 B2 * | 8/2006 | Stangeland | | F04D 29/426 415/183 |
| 7,648,331 B2 * | 1/2010 | Spakovszky et al. | | 415/1 |
| 7,698,894 B2 * | 4/2010 | Wood | | F02B 37/22 123/572 |
| 7,721,542 B2 * | 5/2010 | Chen | | F02M 25/071 123/568.17 |
| 7,811,049 B2 * | 10/2010 | Xu | | F01D 11/10 415/145 |
| 7,931,441 B1 * | 4/2011 | Pinera et al. | | 416/171 |
| 7,967,556 B2 * | 6/2011 | Gummer | | 415/144 |
| 8,152,444 B2 * | 4/2012 | Guemmer | | F01D 5/145 415/58.5 |
| 8,262,351 B2 * | 9/2012 | Clemen | | F04D 27/0207 415/115 |
| 8,322,138 B2 * | 12/2012 | Jackson | | F01M 13/022 123/572 |
| 8,475,111 B2 * | 7/2013 | Stagg | | F04D 17/06 415/1 |
| 8,800,259 B2 * | 8/2014 | Smith et al. | | 60/204 |
| 9,003,791 B2 * | 4/2015 | Ibaraki | | F02M 25/0712 123/568.17 |
| 9,074,533 B2 * | 7/2015 | Hiller | | F04D 27/0238 |
| 9,091,275 B2 * | 7/2015 | Chen | | F02M 25/0706 |
| 2005/0022526 A1 * | 2/2005 | Scheinert | | F02B 29/0412 60/611 |
| 2005/0152775 A1 * | 7/2005 | Japikse | | F01D 5/143 415/1 |
| 2005/0191172 A1 * | 9/2005 | Meng et al. | | 415/173.5 |
| 2006/0104805 A1 * | 5/2006 | Gummer | | F04D 27/0215 415/58.5 |
| 2007/0144170 A1 * | 6/2007 | Griffith | | F01D 5/048 60/600 |
| 2007/0266705 A1 * | 11/2007 | Wood et al. | | 60/599 |
| 2007/0269308 A1 * | 11/2007 | Wood | | 415/57.1 |
| 2007/0271920 A1 * | 11/2007 | Marsal | | F02M 25/0709 60/605.2 |
| 2008/0232952 A1 * | 9/2008 | Gu | | F04D 27/0215 415/11 |
| 2008/0247866 A1 * | 10/2008 | Sirakov | | F04D 29/4213 415/144 |
| 2008/0247870 A1 * | 10/2008 | Sirakov | | F04D 29/4213 415/226 |
| 2009/0317232 A1 * | 12/2009 | Guemmer | | F01D 5/225 415/58.5 |
| 2010/0034637 A1 * | 2/2010 | Guemmer | | F04D 29/526 415/58.5 |
| 2010/0150698 A1 * | 6/2010 | Wood et al. | | 415/58.2 |
| 2011/0200470 A1 * | 8/2011 | Schutz | | F04D 27/0215 417/431 |
| 2011/0214421 A1 * | 9/2011 | Schmitt | | F02B 39/00 60/605.2 |

* cited by examiner

CENTRIFUGAL TURBOMACHINES HAVING EXTENDED PERFORMANCE RANGES

RELATED APPLICATION DATA

This application claims the benefit of priority of U.S. Provisional Patent Application Ser. No. 61/419,019, filed on Dec. 2, 2010, and titled "Systems and Methods for Extending the Performance Range of Centrifugal Compressors Using High-Momentum Flow Injection," and U.S. Provisional Patent Application Ser. No. 61/419,021, filed on Dec. 2, 2010, and titled "Systems and Methods for Extending the Performance Range of Centrifugal Compressors Using a Modulated Inlet Flow Path," each of which is incorporated by reference herein in its entirety.

FIELD OF THE INVENTION

The present invention generally relates to the field of centrifugal turbomachines. In particular, the present invention is directed to centrifugal turbomachines having extended performance ranges.

BACKGROUND

The performance characteristics of a given turbocharged internal combustion engine (ICE) rely on the proper selection and integration of turbomachinery elements. Component efficiency levels and flow capacities, coupled with the limits of stable compressor operation, heavily influence the overall power output, transient response, and emissions control strategies available to engine designers. To address tightening emissions requirements, most of the emerging clean combustion strategies rely on heavy exhaust gas recirculation (EGR) and subsequently place higher demands on the turbocharger and proper turbocharger-to-ICE matching.

In general terms regarding compressor performance requirements, the approach for reduced emissions via higher EGR utilization is in direct opposition to achieving a rated engine power condition. Since a portion of the charge air is recycled at high pressure, high EGR has the effect of increasing the required compressor pressure ratio, while reducing the necessary mass flow rate, thus driving the compressor towards or past the stable operating limit. In opposition to the low-flow requirements of the high EGR, low-emissions strategy is the rated power condition, typically requiring substantially higher flow with equivalent or slightly increased pressure ratio.

As the operating range requirements are increased for a single stage centrifugal compressor, an apparent limit in usable range is reached. Useable range is typically defined as a region where the compressor efficiency exceeds a desired minimum threshold value. Typically, the minimum level of efficiency is based on the duty cycle and life requirements of the various interacting system components, including the compression stage. Stable operating range can be increased further without improving the usable operating range, thus yielding minimal benefits. Due to the extremely broad required range, oftentimes the solution is two compressors (small and large) designed to deliver high performance levels at differing flow rates. The changeover between the small and large compressors is regulated via valves. To achieve the desired range in a single compressor requires compromises in the design process. Traditionally, recirculating casing treatments are applied to the baseline compressor to extend the stable operating range. The primary approach is that flow is removed from the mid-passage region (between compressor leading and trailing edge) and then re-introduced upstream of the compressor inlet.

To improve internal combustion engine emissions levels, exhaust gas is recirculated in varying amounts. Typically, exhaust gas is removed upstream of the turbine at high temperature and pressure and re-introduced at high pressure prior to entering the cylinders of the engine. The EGR loop can pass through an EGR cooler and can have a throttle valve in place to modulate the flow rate.

SUMMARY OF THE DISCLOSURE

In one implementation, the present disclosure is directed to an apparatus. The apparatus includes a centrifugal turbomachine that includes: an impeller rotatable about a rotational axis and having: an inlet region located proximate to the rotational axis; an outlet region located distal from the rotational axis; and a plurality of blades extending between the inlet and outlet regions; an intake designed and configured to direct a working fluid to the inlet region of the impeller; and a performance-range-enhancing treatment applied to the intake and designed and configured to enhance the performance range of the centrifugal turbomachine; wherein the performance-range-enhancing treatment is a non-self-bleed treatment.

In another implementation, the present disclosure is directed to a method of extending the performance-range of a centrifugal turbomachine that includes: an impeller rotatable about a rotational axis and having: an inlet region located proximate to the rotational axis; an outlet region located distal from the rotational axis; and a plurality of blades extending between the inlet and outlet regions; and a casing circumferentially enshrouding the impeller so as to defined a blade-tip-clearance gap between the casing and the plurality of blades. The method includes injecting a high-momentum flow so as to reenergize flow within the blade-tip-clearance gap, wherein the high-momentum flow is not a flow from a self-bleed-type casing treatment of the centrifugal turbomachine.

In still another implementation, the present disclosure is directed to a method of extending the performance-range of a centrifugal turbomachine that includes an impeller rotatable about a rotational axis and having an inlet region located proximate to the rotational axis, and an outlet region located distal from the rotational axis. The method includes: during times of relatively low mass flow of a working fluid into the centrifugal turbomachine, directing substantially all of the working fluid to the inlet region of the centrifugal turbomachine through a primary flow region; and during times of relatively high mass flow of the working fluid into the centrifugal turbomachine, directing a portion of the working fluid to a secondary flow region radially outward from the primary flow region.

In yet another implementation, the present disclosure is directed to a system. The system includes an internal combustion engine having combustion-gas intake and an exhaust-gas outlet; a forced-induction system designed and configured to provide a combustion gas to the internal combustion engine via, the forced-induction system includes a centrifugal compressor having an inlet region; an exhaust-gas-recirculation system designed and configured to provide a portion of an exhaust gas from the exhaust-gas outlet to the combustion-gas intake; and at least one flow injector fluidly connecting the exhaust-gas recirculation system to the inlet region of the centrifugal compressor and designed and configured to provide a flow of at least some of the exhaust gas to the inlet region of the centrifugal compressor.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
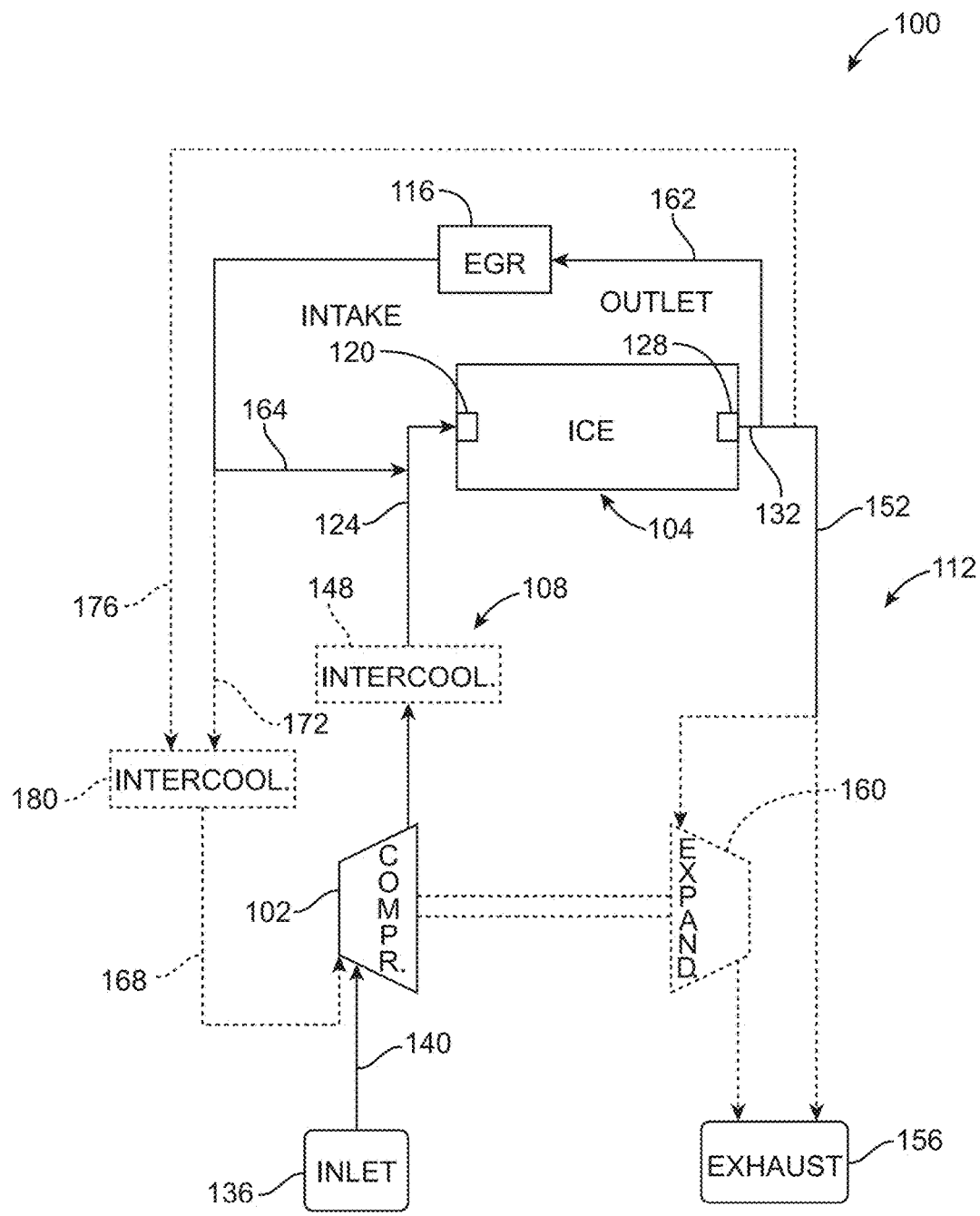
FIG. 1 is block diagram of an internal-combustion-engine (ICE) system incorporating aspects of the present invention.

Referring now to the drawings, for illustrative purposes FIG. 1 shows an internal-combustion-engine (ICE) system 100 that includes a centrifugal turbomachine, here a centrifugal compressor 102, and an internal combustion engine (ICE 104). As will be described below in detail, centrifugal compressor 102 includes a unique treatment that functions to extend the performance range of the compressor and, in some cases, can also beneficially affect the performance envelope of ICE 104. However, before describing several examples of the unique compressor treatment, exemplary system 100 is described more fully to provide the reader with good context for those examples.

As seen in FIG. 1, ICE system 100 also includes a combustion-gas-charging system 108, an exhaust system 112, and an exhaust-gas-recirculation (EGR) system 116. As those skilled in the art will readily appreciate, ICE 104 includes an intake 120 for receiving a combustion-gas flow 124 from combustion-gas-charging system 108 and also includes an outlet 128 for exhausting an exhaust-gas flow 132 from the combustion process that occurs within the ICE. ICE 104 can be any suitable internal combustion engine, such as, but not limited to, a reciprocating engine (e.g., two-stroke, four-stroke, six-stroke, Otto cycle, Diesel, Atkinson cycle, etc.), a rotary engine (e.g., Wankel), and a continuous-combustion engine (e.g., gas turbine, jet engine, etc.). Those skilled in the art know that any of these ICEs contain additional systems, such as fuel delivery systems, cooling systems, lubrication systems, starter systems, etc. However, such systems are well-known, and it is not necessary to address them herein for those skilled in the art to understand the variety of aspects of the present invention.

Combustion-gas-charging system 108 includes an inlet 136 for receiving a combustion gas or gas mixture 140 (here, air), and a centrifugal compressor 102 for compressing the gas/gas mixture for delivery to intake 120 of ICE 104 at an appropriate pressure. As mentioned above, centrifugal compressor 102 is unique at least in the manner that it includes a performance-range-enhancing treatment applied to its intake, wherein the treatment is not a conventional turbomachine-bleed-type treatment. That is, the unique intake treatment of centrifugal compressor 102 does not rely on working fluid flow bled off of the compressor itself, such as occurs in conventional casing treatments. Specific examples of non-bleed-type treatments that can be incorporated into a centrifugal compressor 102 are described below in detail. Optionally, combustion-gas-charging system 108 can include one or more intercoolers 148 for cooling the now-compressed gas/gas mixture 140 to a temperature to suit ICE 104 and its operating parameters.

Exhaust system 112 carries a portion 152 of exhaust-gas flow 132 away from ICE 104 and out of system 100 at an exhaust 156. Depending on the way centrifugal compressor 102 is driven, exhaust system 112 may include an expansion turbine 160 mechanically linked to the compressor for driving the compressor. Alternatively, however, centrifugal compressor 102 can be driven in other ways, such as in a supercharger fashion via a mechanical connection (not shown) to a rotating part driven by ICE 104. Of course, exhaust system 112 can include any other suitable and/or necessary components, such as a catalytic converter, muffler, etc.

Exhaust-gas-recirculation system 116 supplies a portion 164 of exhaust-gas flow 132 to combustion gas flow 124 for reasons of pollution control, as is well known in the art. Depending on the type of non-bleed-type treatment applied to centrifugal compressor 102, another portion 168 of exhaust-gas flow 132, which is at a high pressure, may be provided to the centrifugal compressor, either from EGR system 116, as depicted by high-pressure-exhaust flow 172, or separate from the EGR system, as depicted by high-pressure-exhaust flow 176, or a combination thereof. The use of high-pressure-exhaust flow(s) 172, 176 in connection with centrifugal compressor 102 is described below in detail. If desired to suit a particular design, one or more intercoolers 180 can be used to cool either or both of high-pressure-exhaust flow(s) 172, 176 prior to delivery to centrifugal compressor 102 as portion 168.

Figure 2A:
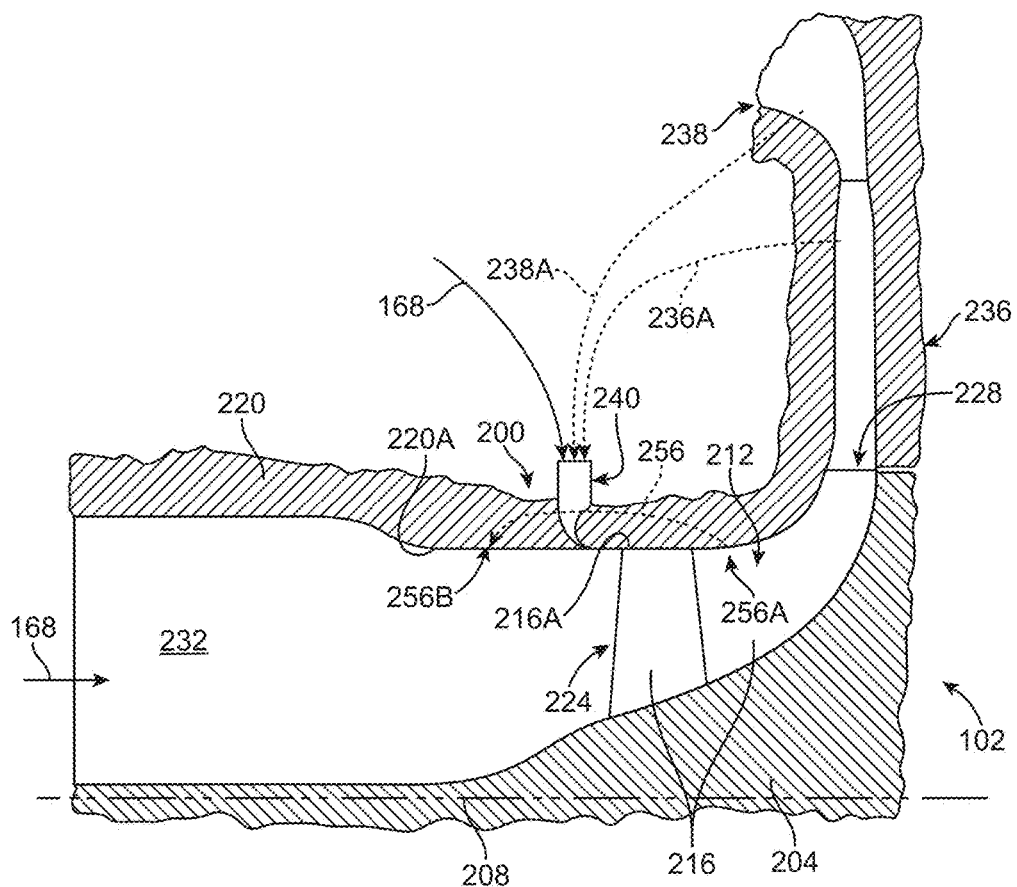
FIG. 2A is an axial cross-sectional view of a portion of one embodiment of the centrifugal compressor of FIG. 1, illustrating a performance-enhancing treatment that involves injecting high-pressure gas into the compressor at the impeller-blade-tip region using a Coanda-style injector.

FIG. 2A illustrates an exemplary non-self-bleed-type treatment 200 of the present invention that can be applied to any suitable centrifugal turbomachine, such as a compressor, blower, or pump, among others, for the purpose of increasing the performance range of the turbomachine. For the sake of convenience of illustration, treatment 200 is described in the context of compressor 102 of FIG. 1 in the ICE application of system 100. However, those skilled in the art will readily appreciate the modifications necessary to adapt treatment 200 to other types of turbomachines and/or other types of applications. As will be readily appreciated from reading this entire disclosure, treatment 200, and each other treatment of the present invention, can be characterized as a "non-self-bleed-type treatment" because it does not involve bleeding flow from the compressor itself from a location upstream of the impeller outlet for injection at the low-pressure side of the compressor, as occurs in some conventional treatments. Rather, in distinction, exemplary non-bleed-type treatment 200 involves injecting high-momentum flow from either downstream of the impeller outlet, where the pressure is high enough to achieve the desired results of the high-momentum-flow injection, or another part of ICE system 100 having a suitable fluid flow that likewise has a pressure great enough to support the high-momentum-flow injection.

As will be seen in connection with the embodiment of FIG. 2A, flow for the high-momentum injection of the present invention can be obtained from a location on the centrifugal turbomachine downstream of the impeller outlet, such as the diffuser (236) and/or volute (238), where the pressure can be high enough (depending on the operating state of the turbomachine) to support the desired high-momentum-flow injection. In other embodiments, the flow for the high-momentum-flow injection is taken from a location outside the centrifugal turbomachine. For example, in the embodiment of FIG. 1, that flow is high-pressure-exhaust flow portion 168 from EGR system 116 and/or from exhaust system 112. However, the flow for the high-momentum-flow injection can come from another part of the overall system of which the turbomachine at issue is a part. For example, in ICE system 100 of FIG. 1, the flow can come from an intake manifold (not shown) that can be present at intake 120 of ICE 104. In other industries/applications, injection flow for the high-momentum injection can be drawn from other locations, such as from flow downstream of an after-cooler, among other application-dependent locations. Those skilled in the art will readily be able to determine a suitable source for flow for high-momentum injection as a function of the application at issue. Thus, all such possibilities need not be explicitly disclosed herein for those skilled in the art to appreciate the broad scope of this aspect of the present invention.

Referring now to FIG. 2A, and also occasionally to FIG. 1 for contextual reference, in this instantiation compressor 102 comprises a rotor 204 that is rotatable about a rotational axis 208 and includes a impeller 212 having a plurality of blades 216 of any suitable number and configuration suitable for the conditions within ICE system 100 of FIG. 1. Those skilled in the art will understand how to design impeller blades 216 using suitable design techniques. Centrifugal compressor 102 also includes a casing 220 that enshrouds impeller 212 and partially functions to define inlet and outlet regions 224 and 228, respectively, of the impeller. In the present example, casing 220 also provides an intake 232, a diffuser 236, and a volute 238 of the compressor as a whole.

In one embodiment, treatment 200 includes one or more injectors 240 that inject high-pressure-exhaust flow portion 168 of exhaust flow 132 of ICE system of FIG. 1 into inlet region 224 at the radially outward region of the blade-tips 216A of impeller blades 216. In another embodiment, the flow injected by injector(s) 240 is taken from diffuser 236, as indicted by arrow 236A, and in yet another embodiment, the flow injected by the injector(s) is taken from volute 238, as indicated by arrow 238A. As mentioned above, in other embodiments, the injection flow can come from other parts of ICE system 100 having suitable flow that has suitable pressure. In this example, each injector 240 is a Coanda-flow injector designed and configured for injecting high-pressure-exhaust flow portion 168 so that it has a substantial component parallel to the interior wall 220A of casing 220 at the region of blade tips 216A at the location of the blade-tip clearance gap, G (see FIG. 2B), between the blade tips of blades 216 and the interior wall of the casing.

Providing high-momentum flow at the region of the impeller blade tips via Coanda-flow injection of high-pressure flow by one or more injectors can expand the stable-operating range, and hence, performance range of a turbomachine, such as single-stage centrifugal compressor 102 of FIGS. 1 and 2A, by locally reenergizing the blade-tip gap and near-shroud flow at the blade tips. Another benefit of using high-pressure flow obtained from a location other than upstream of outlet region 228 of impeller 212 of centrifugal compressor 102 is that operating stability and performance are enhanced without causing significant losses that conventional self-bleed-type treatments can cause.

Figure 2B:
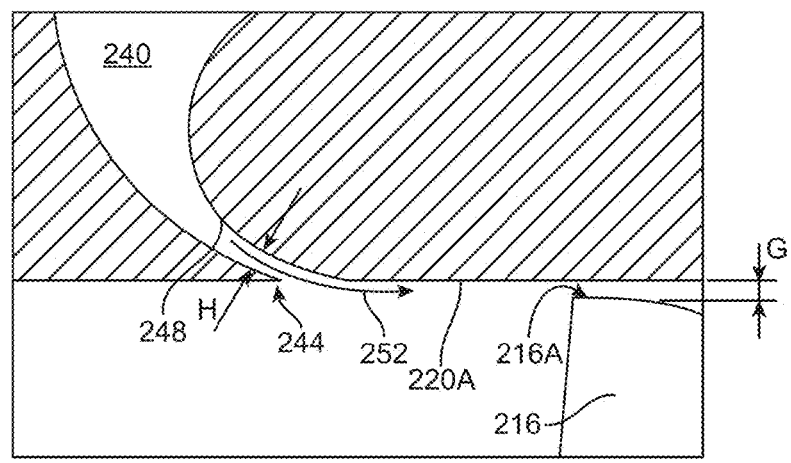
FIG. 2B is an enlarged cross-sectional view of the centrifugal compressor of FIG. 2A, showing the blade-tip region and the high-pressure-exhaust flow injector outlet in more detail.
Figure 3:
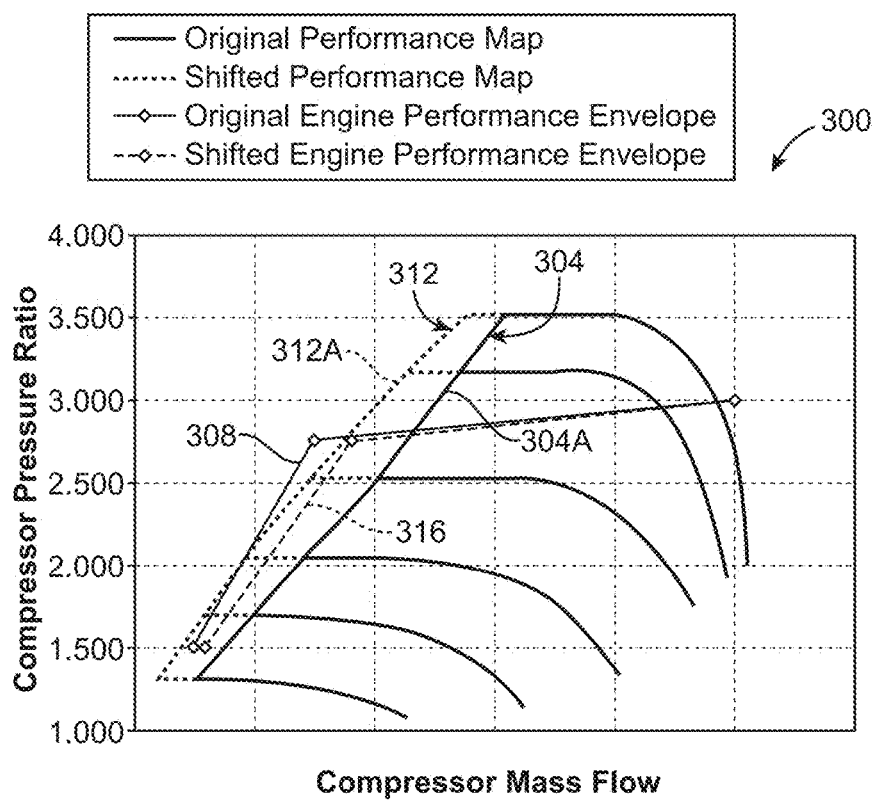
FIG. 3 is a graph of pressure ratio versus mass flow illustrating performance improvements gained using a non-self-bleed-type treatment made in accordance with the present invention.

In this connection, FIG. 3 is a graph 300 of outlet-to-inlet pressure ratio versus mass flow illustrating performance enhancement that can be achieved using a non-self-bleed-type treatment of the present invention, such as the Coanda-flow style injection illustrated with treatment 200 of FIGS. 2A and 2B. Graph 300 shows a conventional performance map 304 for a typical conventional centrifugal turbomachine that does not include a non-self-bleed treatment made in accordance with the present invention. Graph 300 also shows a typical engine performance envelope 308 for a contemporary ICE, such as ICE 104 of FIG. 1. As can be readily seen from graph 300, a significant portion of engine performance envelope 308 is beyond the surge line 304A of conventional performance map 304, indicating that the compressor is not properly matched to the engine at issue.

Graph 300 further shows an enhanced performance map 312 for essentially the same centrifugal turbomachine, but in this case the turbomachine is enhanced with a non-self-bleed treatment made in accordance with the present invention, here a Coanda-flow-style injection treatment similar to treatment 200 of FIGS. 2A and 2B that uses EGR flow for the Coanda-flow injection. As can be seen, the surge line 312A of performance map 312 has shifted to lower mass flow rates, indicating that the performance range of the compressor is enhanced relative to the corresponding conventional compressor not having the non-self-bleed treatment of the compressor corresponding to enhanced performance map 312. In addition to the shifting of surge line 312A, it is also seen in graph 300 that engine performance envelope 308 has shifted to new position indicated by shifted engine performance envelope 316. As those skilled in the art will readily appreciate, this shift in the engine performance envelope is due to the fact that flow from the EGR flow is now part of the working fluid of the compressor.

Figure 4:
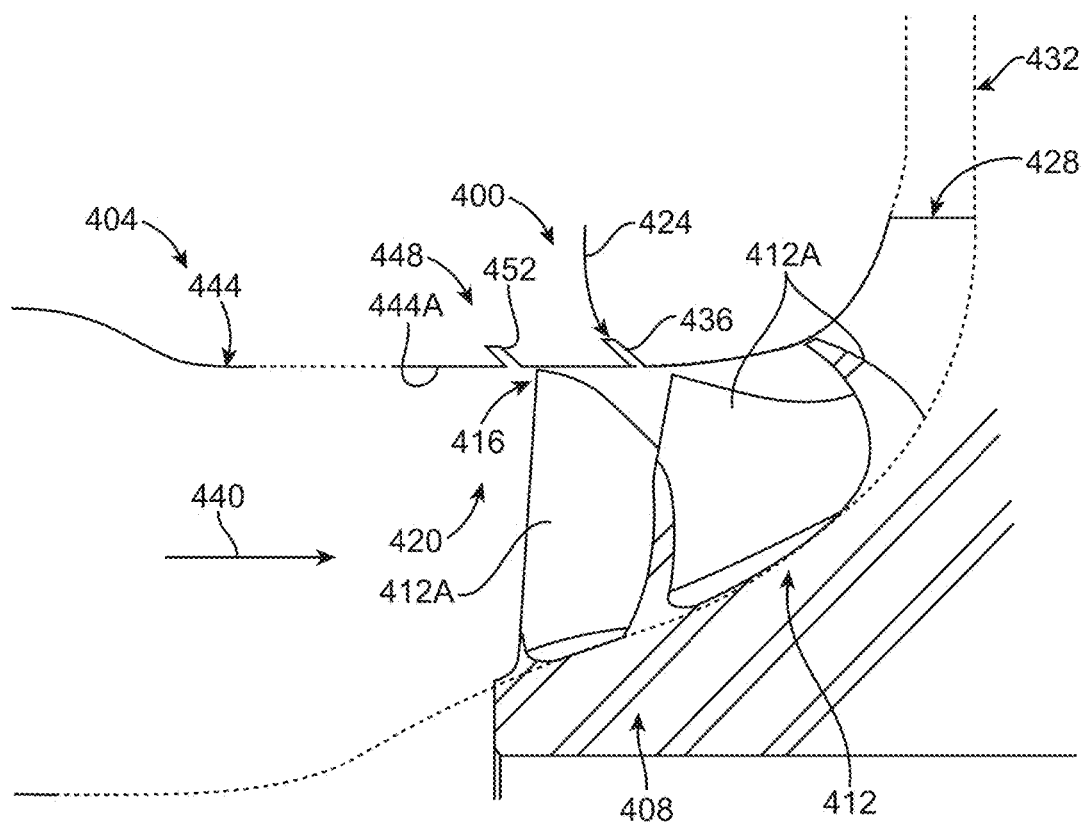
FIG. 4 is a schematic cross-sectional view of a portion of another embodiment of the centrifugal compressor of FIG. 1, illustrating another performance-enhancing treatment that involves injecting high-pressure gas into the compressor at the impeller-blade-tip region using an angled-slot-style injector.

Referring again to FIGS. 2A and 2B, injector(s) 240 can be provided, for example, with a single outlet 244 that extends continuously around entire casing 220 upstream of the region of impeller blade tips 216A. Alternatively, injector(s) 240 can be provided with discrete outlets spaced apart around the inner circumference of inner wall 220A of casing 220. In addition, injector(s) 240 need not be Coanda-style injector(s), but rather can be configured in another manner, such as, as angled-slot injector(s), a couple of embodiments of which are shown in FIG. 4 and described below. Regardless of the type of configuration used for the high-momentum-flow injector(s), those skilled in the art will be able to determine specific geometric details of the selected configuration, such as slot height, slot width, injection angle (to set the tangential component of the injected flow), location relative to the region of blade tips 216A, and meridional contouring between the location of injection and blades 216, as part of routine optimization in the detailed design process. For circumferential slot, Coanda-style injectors, it currently appears that in some embodiments the slot should be 1) sized such that it is near critically choked (in attempt to avoid inducing a shock), while providing enough momentum transfer to delay the onset of instability towards desirable lower flow and 2) located approximately 5% to approximately 10% upstream of the leading edges of the impeller blades with no appreciable shroud radius change from injection location to leading edge.

As mentioned above, exemplary injector 240 is a Coanda-style flow injector in which a fluid jet tends to be attracted to a nearby surface. FIG. 2B shows outlet 244 of injector 240 and the region of blade tips 216A in greater detail. As can be seen in FIG. 2B, injector 240 has an outlet surface 248 that is contoured so as to smoothly transition to inner wall 220A of casing 220 proximate to the region of blade tips 216A. This smooth transition creates the Coanda effect in which the fluid jet (illustrated in FIG. 2B by arrow 252) exiting outlet 244 is attracted to curved outlet surface 248 and tends to remain close to inner wall 220A as it travels to the region of blade-tip clearance gap G between blade tips 216A of impeller blades 216 and inner wall 220A of casing 220. Clearance gap G is a region in conventional compressors and other similar turbomachines in which inlet flow tends to lose significant amounts of momentum in a direction toward impeller 212 and thereby tends to cause stability issues for the turbomachine.

Useful enhanced performance can be obtained using moderate amounts of injection, for example, from about 5% to 20% of the mass flow through the compressor. However, higher and lower amounts of injection can be used to satisfy particular design requirements. In some embodiments, it can be desirable to use an injector height, H, that is on the order of blade-tip clearance gap G, or in some cases, less. In addition, the temperature of the high-momentum flow injected by injector(s) 240 relative to the temperature of the incoming flow of the working fluid, here, portion 124 of exhaust flow 132 (FIG. 1) can affect the impact of non-self-bleed treatment 200. For example, when the temperature of the injected flow is lower than the working fluid temperature, the effectiveness of the injection is higher than when the temperature of the injected flow is higher than the working fluid temperature.

Classical fluid mechanics will indicate that the injection pressure and temperature both play critical roles in determining the effect of the injected flow. Injection source pressure relative to the pressure at the injection location can be a key determiner of whether the injector is choked or not. A choked slot can be beneficial as the injection flow rate is essentially constant for a range of operating conditions and a given injector geometry. Thus to fine-tune the injector's influence, the throat geometry can be adjusted, assuming everything else is a constant. Further, when the injector throat is at the discharge, then the requirement for choking is a pressure ratio across the injector of approximately 1.9 or higher. Increased injection temperature decreases the injection density and therefore the flow rate through a given injector. Additionally, the increase in temperature can lead to increased compressor work and decreased stage efficiency. Given the same level of injected momentum, this is the primary reason that cold injection appears to provide better results than hot injection.

In this example, diffuser 236 is a radial vaneless diffuser. However, non-self-bleed-type injection treatment 200 can be used with, for example, various types of vaned diffusers and/or inlet guide vanes, as well as with mixed-flow compressors. It is also noted that treatment 200 can also be used in conjunction with one or more conventional casing treatments, such as the treatment represented by arrow 256, which has a suction end 256A in the region of impeller 212 and an injection end 256B upstream of inlet region 244 of the impeller.

As mentioned above, FIG. 4 illustrates an angled-slot-style high-momentum flow injector treatment 400 that is an alternative to the Coanda-flow-style arrangement illustrated in FIGS. 2A and 2B. In FIG. 4, treatment 400 is applied to a centrifugal turbomachine 404 comprising a rotor 408 that includes an impeller 412 having a plurality of impeller blades 412A, which have a blade-tip region 416 at the inlet region 420 to the impeller. Similar to Coanda-flow-style treatment 200 of FIGS. 2A and 2B, treatment 400 of FIG. 4 involves the injection of high-momentum flow 424 taken from a location either downstream of the outlet region 428 of impeller 412, for example, from the diffuser 432, volute (not shown) or completely downstream of turbomachine 404, or from another source within the system of which turbomachine 404 is part. Regarding the latter, in the context of ICE system 100 of FIG. 1, high-momentum flow 424 can be portion 168 of either EGR gas flow 172 or exhaust flow 176.

To effect that injection, treatment 400 includes at least one angled-slot injector 436, which is angled in the direction of the flow 440 of working fluid into turbomachine 404. When a single angled-slot injector 436 is provided, it can be continuous around the circumference of the inner wall 444A of casing 444. When multiple angled-slot injectors 436 are provided, they can be provided at discrete locations around the circumference of inner wall 444A and in a number suitable for the application at issue. It is noted that in some embodiments, regardless of whether one or more than one angled-slot injectors 436 are provided, it can be desirable for the high-momentum flow to have a tangential component in the direction of rotation of rotor 408. Treatment 400, in this example, is located somewhat downstream of inlet region 420 of impeller 412. In an alternate or complementary treatment 448, the one or more high-momentum-flow angled-slot injectors 452 can be located upstream of blade-tip region 416. All other features of differently located angled-slot injector(s) can be the same as or similar to angled-slot injector(s) 436 of treatment 400.

The injection of high-momentum flow through an angled injector has the purpose of directing the momentum jet into the passage to beneficially influence the local flowfield. It is expected that the best use of this approach surrounds the redistribution of momentum and the effects resulting from the entrained flow. Even at shallow angles, it is anticipated that the injection flow will separate from the shroud wall. Currently it is conceived that injection within the passage will provide a means of providing a fluidic buffer to delay the upstream migration of naturally occurring low-momentum fluid along the shroud. Depending on implementation, this may also serve as a means to induce more flow into the tip region of the rotor inlet, adding some robustness to the flowfield in the inlet tip region. Injection upstream of the leading edge may be used to condition the incoming flowfield and adjust the spanwise distribution of fluid. The location for the angled injector is not expected as the preferred approach as the flow will likely separate in the inlet tip region increasing the likelihood of instability. In addition, it is noted that either/both of treatments 400 and 448 can be used in conjunction with conventional self-bleed-type casing treatments, such as the casing treatment represented by arrow 256 in FIG. 2A.

Figure 5A:
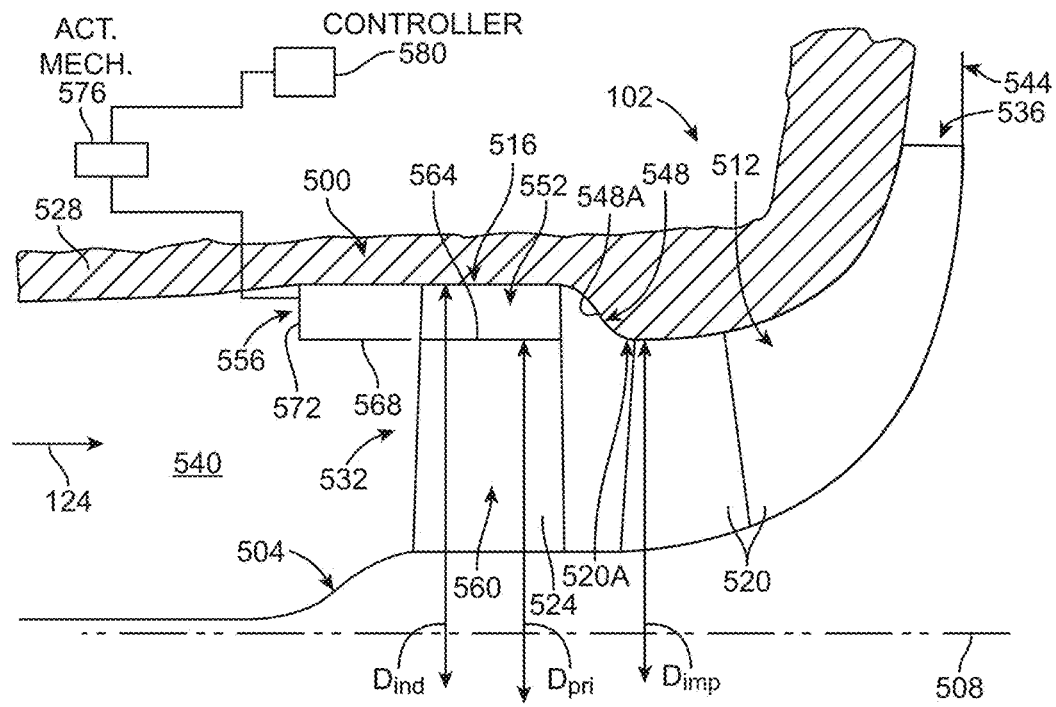
FIG. 5A is a schematic axial cross-sectional view/schematic diagram of a portion of an alternative embodiment of the centrifugal compressor of FIG. 1 illustrating a performance-enhancing treatment that involves modulating a portion of the inlet flow into the compressor.

FIG. 5A illustrates another exemplary non-self-bleed-type treatment 500 of the present invention that can also be applied to any suitable centrifugal turbomachine, such as a centrifugal compressor, centrifugal blower, or centrifugal pump, among others, for the purpose of increasing the performance range of the turbomachine. For the sake of convenience of illustration, treatment 500 is described in the context of compressor 102 of FIG. 1 in the ICE application of system 100. However, those skilled in the art will readily appreciate that treatment 500 can be implemented in applications other than ICE turbo- and supercharging applications.

Referring now to FIG. 5A, and also occasionally to FIG. 1 for contextual reference, in the embodiment shown in FIG. 5A centrifugal compressor 102 includes a rotor 504 rotatable about a rotational axis 508. Rotor 504 comprises both an impeller 512 and an inducer, here split inducer 516. Impeller 512 includes a plurality of impeller blades 520 of any suitable number and configuration. Similarly, inducer 516 includes a plurality of inducer blades 524 of any suitable number and configuration. Those skilled in the art will understand how to configure impeller and inducer blades 520, 524 using appropriate design techniques. Compressor 102 also includes a casing 528 that provides a shroud that generally defines inlet outlet regions 532 and 536, respectively, of the compressor, and, in the present example, also provides an intake 540 and a diffuser 544 of the compressor. In addition, in this embodiment casing 528 also includes a throat region 548, which transitions from a larger cross-sectional-flow area, here at inducer 516 and having a diameter, $D_{ind}$, to a smaller cross-sectional-flow area, here at impeller 512 and having a diameter, $D_{imp}$. Casing 528 at throat region 548 provides a smooth transition 548A from the larger cross-sectional-flow area to the smaller-cross-sectional-flow area. In the embodiment shown with split inducer 516, i.e., with inducer blades 524 spaced axially from impeller blades 520, diameter $D_{imp}$ occurs at blade-tip region 520A, but as will be seen in other embodiments, diameter $D_{imp}$ can occur at other areas of impeller 512.

Generally, treatment 500 provides a secondary flow path, here a generally annular (in cross-section transverse to rotational axis) flow path 552, flow through which is selectively modulated using one or more suitable modulators 556. Secondary flow path 552 is in addition to a primary flow path 560, which is described in more detail below. During times of higher flow, modulator(s) 556 is/are opened to allow secondary flow path 552 to receive a portion of the higher flow. Generally, a primary purpose of the secondary flow path is to simulate a compressor designed for low flow rates (and thus a smaller throat area) and a compressor designed for high flow rates (and thus a larger throat area) using a single rotor. The function of secondary flow path is essentially to provide increased throat area. A dual-flow-path solution, such as provided by treatment 500 and similar treatments of the present disclosure, is desirable when the required operating range of the centrifugal turbomachine is sufficiently large as to typically require two compressor rotors.

In the example shown, secondary flow path 552 is defined in part by a partial shroud 564 on impeller 512 and by a divider wall 568, both of which are located at a distance, $D_{pri}$, from rotational axis 508. As shown, the distance $D_{in}$, which is the outer diameter of primary flow path 560, is substantially equal to diameter $D_{imp}$ at the smaller cross-sectional-flow area at impeller 512. At lower mass flow rates when flow modulator(s) is/are closed and combustion gas flow 124 is only through primary flow path 560, the flow is largely the same as in a similarly sized conventional turbomachine that lacks treatment 500, i.e., additional flow path 552, flow modulator(s) 556, etc., and centrifugal compressor 102 has stability and performance that are largely the same as the similarly sized conventional turbomachine. However, at times of higher flow rates when flow modulator(s) is/are open and combustion gas flow 124 is flowing through both primary flow path 560 and secondary flow path 552, centrifugal compressor 102 has enhanced stability and performance due at least in part to the boost in energy provided to the flow at blade-tip region 520A of impeller 512.

Figure 5B:
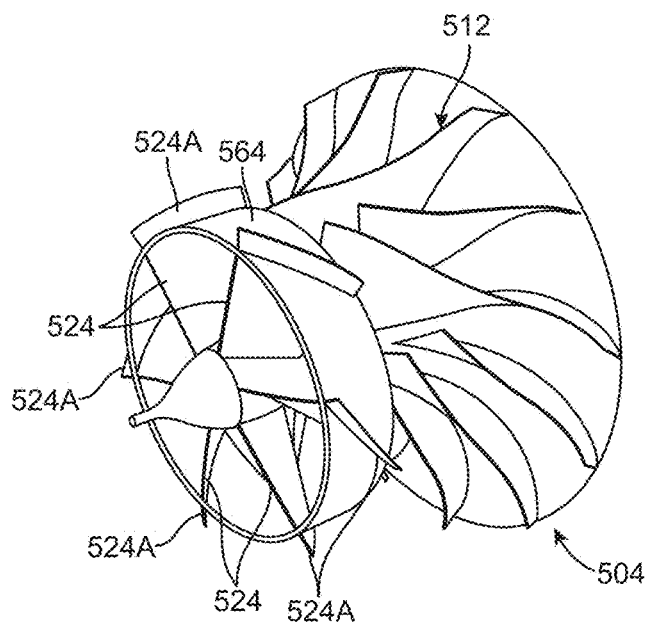
FIG. 5B is an isometric view of the rotor of the compressor embodiment shown in FIG. 5A.

As seen in FIG. 5B, impeller blades 524 extend through partial shroud 564 into secondary flow region 552 (FIG. 5A). The portions of blades 524 radially outward of partial shroud 564 form vanes 524A within secondary flow region 552 that, when flow modulator(s) 556 is/are open to allow flow through the secondary flow region and rotor 504 is rotating, work to increase the density of the flow in the secondary flow region. This increased density allows additional fluid to pass through the smaller-cross-sectional-flow area of diameter $D_{imp}$ at impeller 512. Typically this smaller-cross-sectional-flow area is beneficially sized toward the lower-flow regime and, thus, needs the increased density to pass the required flow.

Referring again to FIG. 5A, flow modulating device(s) can comprise a plurality of valve gates 572 (only one shown) distributed circumferentially about rotational axis 508 at secondary flow region 552. Valve gates 572 are moveable between closed positions (shown) and open positions wherein flow from intake 540 into secondary flow region 552 is substantially un-occluded by the valve gates. Valve gates 572 can be moveable in any suitable manner between the open and close positions, such as radially pivoting in a louvered manner, radially sliding in a guillotine manner, circumferentially pivoting in a butterfly-valve manner, among others. Those skilled in the art will readily understand how to configure gates 572 to create suitable flow-modulator(s) 556.

Valve gates 572 can be actuated to move between their open and closed positions using one or more actuation mechanisms 576 suitable for the type of valve gates used. Actuation mechanism(s) may include, among other things, one or more actuation linkages (not shown) and one or more actuators (not shown) that can be, for example, electromagnetic, electronic, pneumatic, hydraulic, etc. Those skilled in the art will readily understand how to design actuator mechanism(s) 576 appropriate for carrying out the functionality of treatment system 500. Actuator mechanism(s) 576 can be controlled by a suitable controller 580 capable of opening and closing valve gates 572 as a function of mass flow entering intake 540 at a given time. In the context of ICE system 100 of FIG. 1, controller 580 can be, for example, an engine control unit, a control unit responsive to an engine control unit, and a control unit responsive to one or more sensors at any suitable location(s) within the ICE system, among others. Those skilled in the art will readily understand the functionality that controller 580 needs to be imparted with to suitably control operations of treatment 500.

In this example, diffuser 544 is a radial vaneless diffuser. However, non-bleed-type injection treatment 500 can be used with, for example, various types of vaned diffusers and/or inlet guide vanes, as well as with mixed-flow compressors.

Figure 6A:
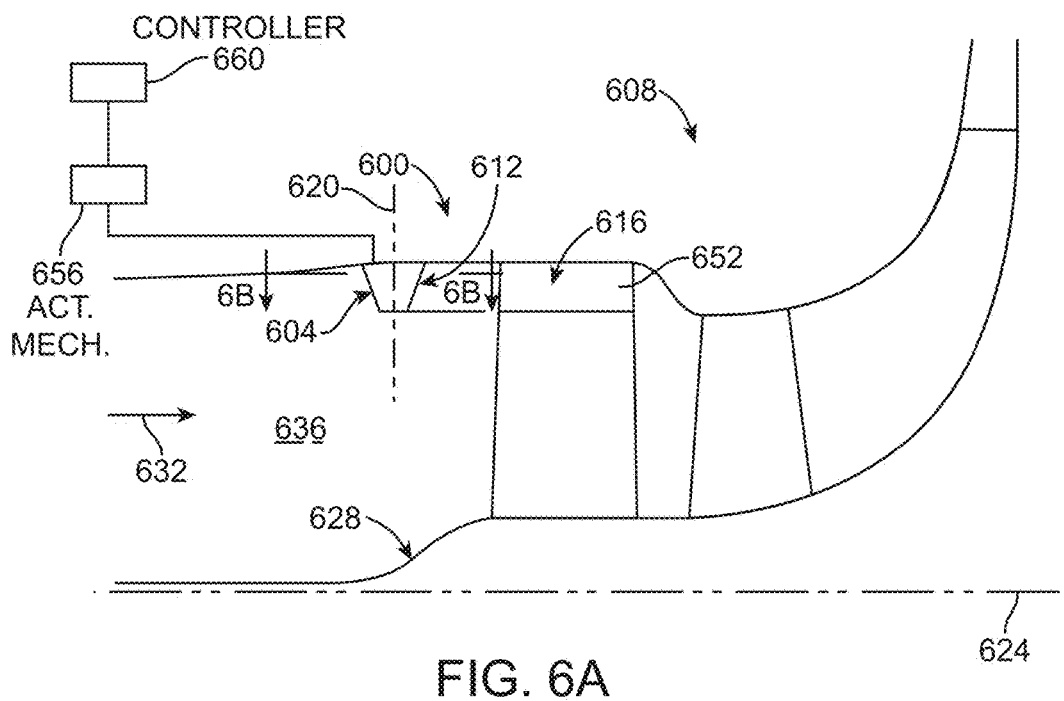
FIG. 6A is a schematic axial cross-sectional view of a portion of a centrifugal turbomachine having a flow-modulation-type performance-enhancing treatment that includes variable inlet guide vanes.

FIG. 6A illustrates a non-self-bleed-type performance-enhancing treatment 600 that, in this example, is essentially the same as performance enhancing treatment 500 of FIGS. 5A and 5B, except that instead of generic valve gates 572 that are shown in FIG. 5A, treatment 600 includes variable inlet guide vanes 604, one of which is shown in an open position. In this example, treatment 600 is applied to a centrifugal turbomachine 608 (which could be designed and configured to function as centrifugal compressor 102 in ICE system 100 of FIG. 1), having the same partially shrouded-split-inducer design as the embodiment of compressor 102 shown in FIGS. 5A and 5B. Therefore, any component of centrifugal turbomachine 608 not particularly described can have the exact same or similar configuration of the corresponding component of the embodiment of centrifugal compressor 102 of FIGS. 5A and 5B.

Figure 6B:
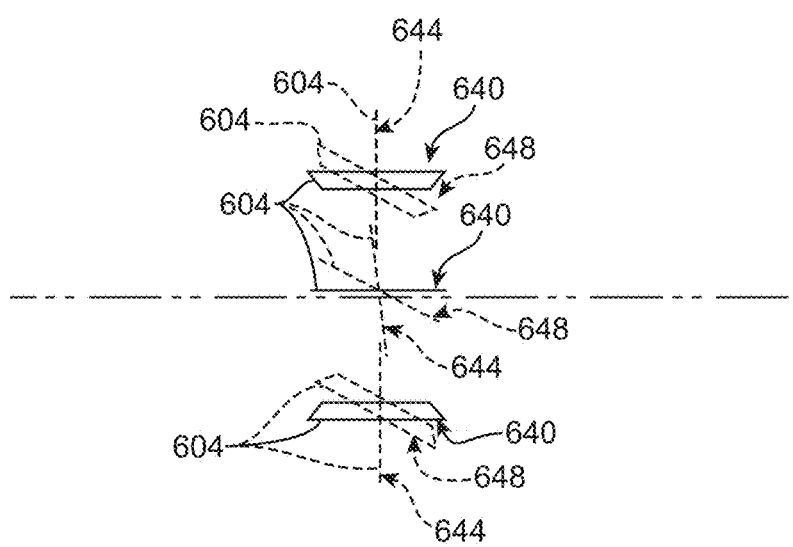
FIG. 6B is an enlarged cross-section as taken along line 6B-6B of FIG. 6A showing the inlet guide vanes in various positions.

Referring to FIGS. 6A and 6B, each inlet guide vane 604 can have the generally trapezoidal shape shown in FIG. 6A. When so shaped and sized, a plurality of like guide vanes 604 are provided in a number that, when in their closed positions, completely close the annular opening 612 of secondary flow region 616 (FIG. 6A). In this example, guide vanes 604 are movable in a louvered manner so that each pivots about a central axis 620 (FIG. 6A) that is radial to rotational axis 624 of rotor 628. Having that movability, guide vanes 604 cannot only be used to open and close secondary flow region 616 to flow 632 entering intake 636, but they can also be used to guide the flow entering into the secondary flow region. Several positions of guide vanes 604 are shown in FIG. 6B.

Referring now to FIG. 6B, guide vanes 604 are shown in their "fully open" positions 640 in which they are oriented axially along rotational axis 624 of rotor 628 (FIG. 6A). Positions 640 are denoted "fully open" since flow 632 entering intake 636 is substantially axial relative to rotational axis 624 and, therefore, the fully open positions shown presents the least resistance to the axial flow. FIG. 6B also illustrates guide vanes 604 in their fully closed positions 644 in which they are oriented transverse to rotational axis 624. As seen in FIG. 6B, each guide vane 604 is sized so that it overlaps with the immediately adjacent guide vanes so as to substantially seal secondary flow region 616. FIG. 6B further illustrates guide vanes 604 in one of many "guiding" positions 648. In this context, a "guiding position" is a position wherein a guide vane 604 is skewed relative to the direction of flow 632 in order to control the direction of the flow into secondary flow region 616. As those skilled in the art will readily appreciate, by suitably guiding flow 632 into secondary flow region 616, especially when inducer vanes 652 are present in the secondary flow region, the efficiency of the inducer vanes can be increased. Referring again to FIG. 6A, as those skilled in the art will readily appreciate that the positioning of guide vanes 604 can be effected using any suitable actuation mechanism 656 under the control of any suitable controller 660 based on current conditions of flow 632 entering centrifugal turbomachine 608.

Figure 7:
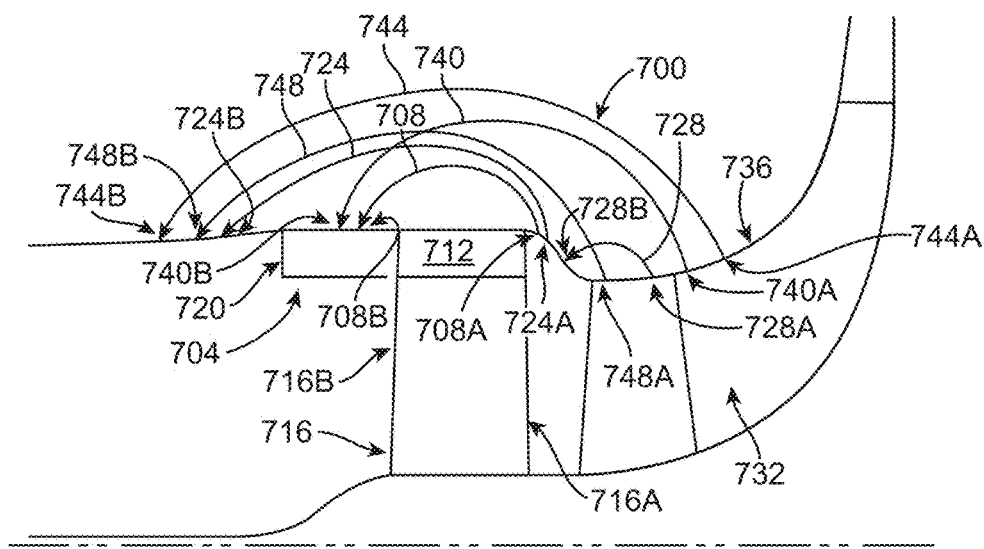
FIG. 7 is a schematic axial cross-sectional view of a portion of another centrifugal turbomachine having a flow-modulation-type performance enhancing treatment, showing various self-bleed-type treatments that can be used in conjunction with the flow-modulation-type performance enhancing treatment.

FIG. 7 illustrates another exemplary centrifugal turbomachine 700 having a non-self-bleed-type performance enhancing treatment 704 that is the same as treatment 500 of FIGS. 5A and 5B. Therefore, any component of turbomachine 700 that is not described in detail can be assumed to be the same as or similar to the corresponding component in the embodiment of centrifugal compressor 102 shown in FIGS. 5A and 5B. Referring to FIG. 7, this figure illustrates that non-self-bleed-type performance enhancing treatment 704 can be used with one or more self-bleed-type treatments.

The self-bleed-type treatments shown in FIG. 7 are: 1) a first inducer casing treatment 708 having suction 708A from secondary flow region 712 proximate the trailing edge 716A of inducer 716 and injection 708B into the secondary flow region 712 between the flow modulator(s) 720 and leading edge 716B of the inducer; 2) a second inducer casing treatment 724 having suction 724A from secondary flow region 712 proximate the trailing edge of the inducer and injection 724B upstream of the flow modulator(s); 3) a first impeller casing treatment 728 having suction 728A from the impeller region 732 and injection 728B between the inducer and the impeller 736; 4) a second impeller casing treatment 740 having suction 740A from the impeller region and injection 740B into the secondary flow region between the flow modulator(s) and the leading edge of the inducer; 5) a third impeller casing treatment 744 having suction 744A from the impeller region and injection 744B upstream of the flow modulator(s); and a fourth impeller casing treatment 748 having suction 748A from the impeller region and injection 748B upstream of the flow modulator(s). Fourth impeller casing treatment 748 can be particularly desirable in the event that the diameter of the impeller downstream of the impeller inlet region needs to be sized larger than desired to pass the necessary flow. In this case the additional stabilization provided by fourth impeller casing treatment 748 can be helpful. Other self-bleed-type treatments may be possible and may also be used with non-self-bleed-type treatment 704 as desired to suit a particular design and/or application.

Figure 8:
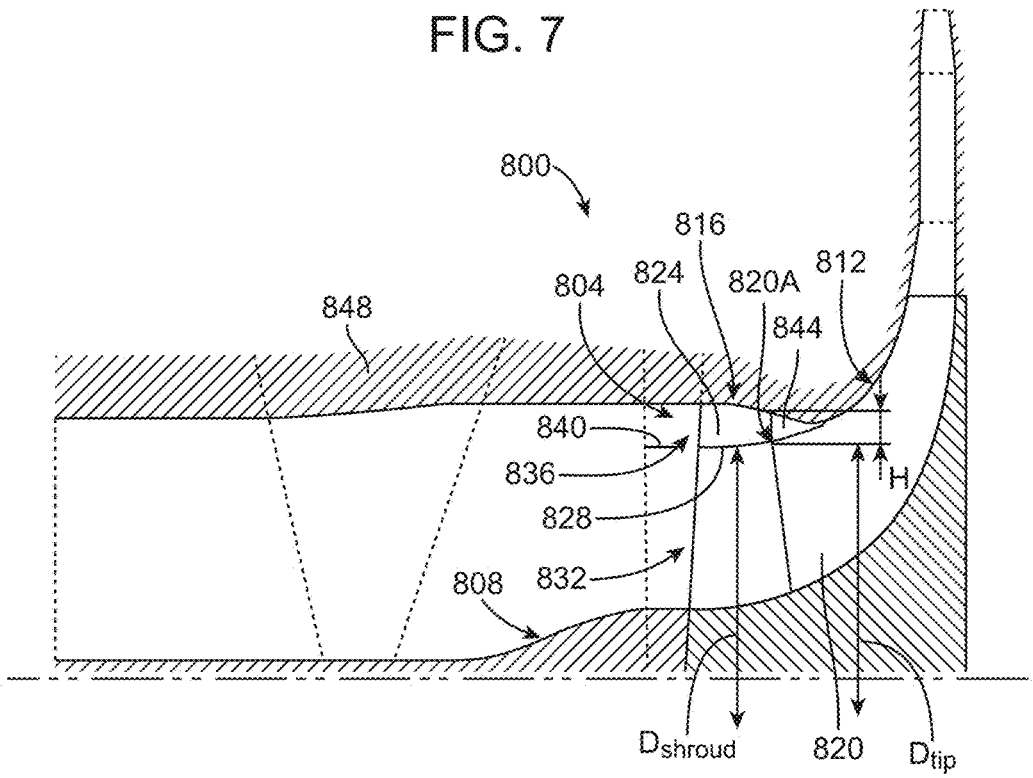
FIG. 8 is an axial cross-sectional view of a portion of yet another centrifugal turbomachine having a non-bleed-type performance-enhancing treatment that includes a shrouded non-split inducer.

FIG. 8 illustrates a centrifugal turbomachine 800 having a non-self-bleed-type treatment 804 incorporated into a non-split-inducer design. In this example, centrifugal turbomachine 800 includes a rotor 808 having an impeller 812 and an inducer 816 that is immediately adjacent to the impeller. Impeller 812 has a plurality of blades 820 that are configured and arranged in a manner suitable for the operating conditions of turbomachine 800. Similarly, inducer 816 has a plurality of blades 824 that are likewise configured and arranged in a manner suitable for the operating conditions of turbomachine 800. Those skilled in the art will understand the various considerations for designing blades 820 and 824. Inducer 816 includes a shroud 828 that separates a primary flow region 832 from a secondary flow region 836 within the inducer. In this example, the outer diameter, $D_{shroud}$, of shroud 828 is substantially equal to the outer diameter, $D_{tip}$, of impeller at the leading edge of tips 820A.

In the example shown in FIG. 8, secondary flow region 836 is further defined by a circular separation wall 840 immediately upstream of inducer 816 and by a space 844 between impeller blades 820 at their inlet ends and a casing 840 that enshrouds impeller 812. As can be seen, at its upstream end, space 844 has a height, H, that is equal to the clearance between blade tips 820A and casing 848. Due to the curvatures of blades 820 and casing 848 at space 844, height H diminishes to a smaller blade clearance gap (not distinguishable because of relatively small size) between the blades and the casing that will typically be on the order of normal blade-casing clearances in conventional centrifugal turbomachines of the proper size and configuration.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for use in a combustion-gas-charging system of an internal combustion engine (ICE) system, the ICE system including combustion gas systems and exhaust gas systems, the apparatus comprising:
    a centrifugal compressor that includes:
        an impeller rotatable about a rotational axis and having:
            an inlet region located proximate to said rotational axis;
            an outlet region located distal from said rotational axis; and
            a plurality of blades each having leading and trailing edges and extending between said inlet and outlet regions;
        a casing defining an intake and having a wall proximate said inlet region of said impeller so as to define a blade-tip clearance gap with said plurality of blades;
        said intake designed and configured to direct a working fluid to said inlet region of said impeller; and
        a performance-range-enhancing treatment applied to said intake and designed and configured to enhance the performance range of said centrifugal compressor, wherein said performance-range-enhancing treatment is a non-self-bleed treatment and includes at least one high-momentum-flow injector located upstream of said leading edges and designed and configured to inject a high-momentum flow from a location in said ICE system downstream of said outlet region of said impeller toward said blade-tip clearance gap;
        wherein said intake comprises a primary flow region for receiving a first portion of the working fluid during operation of said centrifugal compressor, said performance-range-enhancing treatment further comprising:
            a secondary flow region located radially outward from said primary flow region relative to said rotational axis of said impeller, said secondary flow region for receiving a second portion of the working fluid during operation of said centrifugal compressor; and
            a flow partition separating said secondary flow region from said primary flow region, wherein said flow partition is located so that the second portion of the working fluid is joined with the first portion of the working fluid downstream of the flow partition.

2. An apparatus according to claim 1, wherein said at least one high-momentum flow injector comprises a Coanda-flow injector having a curved outlet surface that smoothly transitions to said wall of said casing, said Coanda-flow injector being designed and configured to direct the high-momentum flow along said wall toward said blade-tip clearance gap.

3. An apparatus according to claim 2, wherein said Coanda-flow injector has an outlet having a throat having a dimension that is not greater than about said blade-tip clearance gap.

4. An apparatus according to claim 2, wherein said wall has a circumference and said Coanda-flow injector has a continuous opening around said circumference.

5. An apparatus according to claim 1, wherein said wall has a circumference and said at least one high-momentum-flow injector comprises a plurality of Coanda-flow injectors located discretely around said circumference and each having a curved outlet surface that smoothly transitions to said wall of said casing.

6. An apparatus according to claim 1, wherein said at least one high-momentum flow injector comprises an angled-slot injector.

7. An apparatus according to claim 6, wherein said wall has a circumference and said angled-slot injector has a continuous opening around said circumference.

8. An apparatus according to claim 6, wherein said wall has a circumference and said at least one high-momentum-flow injector comprises a plurality of angled-slot injectors located discretely around said circumference.

9. An apparatus according to claim 1, further comprising a self-bleed-type casing treatment.

10. An apparatus according to claim 1, wherein the exhaust gas systems include an exhaust gas recirculation (EGR) system and an exhaust system, wherein said at least one high-momentum flow injector injects at least one of a combustion gas from the combustion gas system, an exhaust gas from the EGR system, or an exhaust gas from the exhaust system.

11. An apparatus according to claim 1, further comprising a diffuser and a volute located downstream of said impeller and at least one flow channel fluidly connecting said at least one high-momentum-flow injector to at least one of said diffuser and said volute.

12. An apparatus according to claim 1, wherein said centrifugal compressor further includes an inducer rotatable about the rotational axis, and said flow partition comprises a shroud on said inducer.

13. An apparatus according to claim 12, wherein said inducer is not split relative to said impeller.

14. An apparatus according to claim 12, wherein said inducer is split relative to said impeller.

15. A method of extending the performance-range of a centrifugal compressor of a combustion-gas-charging system of an internal combustion engine (ICE) system, the ICE system including combustion gas systems and exhaust gas systems, the centrifugal compressor including:
    an impeller rotatable about a rotational axis and having:
        an inlet region located proximate to the rotational axis;
        an outlet region located distal from the rotational axis; and
        a plurality of blades extending between the inlet and outlet regions; and
    a casing circumferentially enshrouding the impeller so as to define a blade-tip-clearance gap between the casing and the plurality of blades, the casing including a high-momentum-flow injector located upstream of the blade-tip clearance gap;
    the method comprising:
        injecting a high-momentum flow from a location in said ICE system downstream of said outlet region of said impeller through the high-momentum-flow injector in a direction of flow of a working fluid in the compressor so as to reenergize flow within the blade-tip-clearance gap; and
        prior to said injecting, cooling the high-momentum flow.

16. A method according to claim 15, wherein the working fluid has a first temperature, and said injecting includes injecting the high-momentum flow having a second temperature lower than the first temperature.

17. A method according to claim 15, wherein the working fluid has a first temperature, and said injecting includes injecting the high-momentum flow having a second temperature that is substantially the same as the first temperature.

18. A method according to claim 15, wherein the exhaust gas systems include an exhaust gas recirculation (EGR) system and an exhaust system, wherein said injecting includes injecting a portion of at least one of a combustion gas from the combustion gas system, an exhaust gas from the EGR system, or an exhaust gas from the exhaust system.

19. A method according to claim 18, wherein said cooling step includes cooling the portion of the exhaust-gas recirculation prior to said injecting.

20. A method according to claim 15, wherein said injecting includes injecting a Coanda flow toward the blade-tip-clearance gap.

21. A method according to claim 15, wherein said injecting includes injecting the high-momentum flow immediately upstream of the blade-tip-clearance gap.

22. A method according to claim 15, wherein said injecting further includes injecting high-momentum flow downstream of the blade-tip-clearance gap.

23. A method according to claim 15, wherein the exhaust gas systems include an exhaust gas recirculation (EGR) system for recirculating exhaust gas flow to the ICE, the method further comprising:
  splitting the exhaust gas flow in the EGR system between a first portion and a second portion; and
  routing the first portion of the exhaust gas flow directly from the EGR system to the ICE;
  wherein said injecting includes injecting the second portion of the exhaust gas with the high-momentum-flow injector.

24. A method according to claim 23, further comprising cooling the second portion of the exhaust gas flow prior to said injecting.

25. A system, comprising:
  an internal combustion engine having combustion-gas intake and an exhaust-gas outlet;
  a forced-induction system designed and configured to provide a combustion gas to said internal combustion engine, said forced-induction system including a centrifugal compressor having an inlet region;
  an exhaust-gas-recirculation system designed and configured to provide a portion of an exhaust gas from said exhaust-gas outlet to said combustion-gas intake; and
  at least one flow injector fluidly connecting said exhaust-gas recirculation system to said inlet region of said centrifugal compressor and designed and configured to provide a flow of at least some of the exhaust gas to said inlet region of said centrifugal compressor;
  said inlet region including a primary flow region for receiving a first portion of the combustion gas, a secondary flow region located radially outward from said primary flow region, said secondary flow region for receiving a second portion of the combustion gas, and a flow partition separating said secondary flow region from said primary flow region, wherein said flow partition is located so that the second portion of the combustion gas is joined with the first portion of the combustion gas downstream of the flow partition.

26. A system according to claim 25, wherein said internal combustion engine is a reciprocating engine.

27. A system according to claim 25, further comprising an exhaust system for carrying the exhaust gas away from said exhaust gas outlet, said exhaust system including an expansion turbine mechanically coupled to said centrifugal compressor and designed and configured to drive said centrifugal compressor.

28. A system according to claim 25, wherein said centrifugal compressor is mechanically driven by said internal combustion engine.

29. A system according to claim 25, further comprising an exhaust-gas cooler fluidly coupled between said flow injector and said exhaust-gas outlet, wherein said exhaust-gas cooler is designed and configured to cool the flow provided by said flow injector to said centrifugal compressor.

30. A system according to claim 25, wherein said centrifugal compressor includes:
  an impeller rotatable about a rotational axis and having:
    an inlet region located proximate to the rotational axis;
    an outlet region located distal from the rotational axis; and
    a plurality of blades extending between the inlet and outlet regions; and
  a shroud circumferentially surrounding the impeller so as to defined a blade-tip-clearance gap between the shroud and the plurality of blades;
  wherein said at least one flow injector is designed and configured to direct the flow so as to reenergize flow at said blade-tip-clearance gap.

31. A system according to claim 30, wherein said at least one flow injector comprises a Coanda flow injector located upstream of said blade-tip-clearance gap.

32. A system according to claim 31, wherein said at least one flow injector comprises an angled slot injector.

33. A system according to claim 32, wherein said angled slot injector is located upstream from said inlet region of said impeller.

34. A system according to claim 32, wherein said angled slot injector is located downstream from said inlet region of said impeller.

35. An apparatus comprising:
  a centrifugal turbomachine that includes:
    a casing having a wall and defining an intake and a throat region, said wall transitioning in said throat region from a larger cross-sectional flow area upstream of said throat region to a smaller cross-sectional area downstream of said throat region;
    an impeller disposed in said casing and rotatable about a rotational axis and having:
      an impeller inlet and outlet;
      an impeller hub; and
      a plurality of impeller blades extending between said impeller inlet and outlet and extending from said impeller hub to a location adjacent said casing wall; and
    an inducer disposed in said casing and rotatable about said rotational axis, said inducer having a partial shroud;
  said intake having a primary flow region located radially inward of said partial shroud and a secondary flow region located radially outward of said partial shroud; and
  a performance-range-enhancing treatment applied to said intake and designed and configured to enhance the performance range of said centrifugal turbomachine, wherein said performance-range-enhancing treatment includes a flow modulator located in said secondary flow region upstream of said inducer, said flow modulator being designed and configured to modulate flow of a working fluid in said secondary flow region.

36. An apparatus according to claim 35, wherein said secondary flow region has a substantially annular shape that is concentric around said primary flow region.

37. An apparatus according to claim 35, wherein said casing wall has a first inside diameter at a location downstream of said throat region and a second inside diameter at a location upstream from said throat region, wherein said first inside diameter is smaller than said second inside diameter.

38. An apparatus according to claim 37, wherein said secondary flow region has a radial height relative to said rotational axis, and said second inside diameter is substantially equal to said first inside diameter plus twice said radial height.

39. An apparatus according to claim 37, wherein said partial shroud is located so that said primary flow region within said inducer has a third inside diameter substantially equal to said first inside diameter.

40. An apparatus according to claim 35, wherein said performance-range-enhancing treatment includes a divider wall separating said primary flow region from said secondary flow region.

41. An apparatus according to claim 35, wherein said flow modulator is designed and configured to modulate flow of the working fluid to the portion of said inducer radially outward from said partial shroud relative to said rotational axis.

42. An apparatus according to claim 41, wherein said flow modulator is spaced from said inducer upstream from said inducer and said performance-range-enhancing treatment further includes a divider wall located between said flow modulator and said inducer.

43. An apparatus according to claim 42, wherein said divider wall is substantially radially aligned with said partial shroud.

44. An apparatus according to claim 35, wherein said inducer is spaced from said impeller by said throat region.

45. An apparatus according to claim 35, wherein each of said plurality of blades on said impeller has a leading edge at said impeller inlet and said partial shroud has a downstream end located substantially at said leading edge.

46. An apparatus according to claim 35, wherein said flow modulator comprises variable guide vanes.

47. An apparatus according to claim 35, wherein said flow modulator comprises shutters.

48. An apparatus according to claim 35, further comprising a controller designed and configured to control said flow modulator so as to increase flow of the working fluid in said secondary flow region during times of relatively high flow of the working fluid and to decrease flow of the working fluid in said secondary flow region during times of relatively low flow of the working fluid.

49. An apparatus according to claim 35, further comprising a self-bleed-type casing treatment for recirculating a portion of the working fluid from said centrifugal turbomachine to said intake.

50. An apparatus according to claim 49, wherein said self-bleed-type casing treatment includes a suction end located at said impeller proximate said inlet, and an injection end located upstream of said flow modulator.

51. A method of extending the performance-range of a centrifugal turbomachine, the turbomachine including:
    an impeller rotatable about a rotational axis;
    an inducer located upstream of the impeller and rotatable about the rotational axis, the inducer having a partial shroud and partially defining a primary flow region located radially inward of the partial shroud and a secondary flow region located radially outward of the partial shroud;
    a flow modulator located upstream of the inducer and located in the secondary flow region, the flow modulator designed and configured to modulate flow in the secondary flow region; and
    an inlet region upstream of the impeller, and an outlet region downstream of the impeller;
    the method comprising:
    monitoring a flow rate of a working fluid entering the centrifugal turbomachine;
    during times of relatively low flow of the working fluid into the centrifugal turbomachine, closing the flow modulator, thereby directing substantially all of the working fluid to the inlet region of the centrifugal turbomachine through the primary flow region; and
    during times of relatively high flow of the working fluid into the centrifugal turbomachine, opening the flow modulator to increase a throat area of the centrifugal turbomachine and direct a portion of the working fluid to the secondary flow region to increase a flow capacity of the turbomachine.

52. A method according to claim 51, wherein said opening the flow modulator includes opening a valve.

53. A method according to claim 51, wherein said opening the flow modulator includes adjusting a set of guide vanes.

54. A method according to claim 51, further comprising increasing the density of the portion of working fluid in the secondary flow region prior to the portion reaching the impeller.

55. A method according to claim 54, wherein said increasing the density of the portion of working fluid includes increasing the density using the inducer.

56. A method according to claim 51, further comprising monitoring the flow of the working fluid entering the centrifugal turbomachine and modulating the portion of the working fluid directed to the secondary flow region as a function of said monitoring.

* * * * *